3,109,011
PREPARATION OF CARBOALKOXY ALKYL SILANES FROM SILANES CONTAINING SILANIC HYDROGEN AND ACRYLIC ACID ESTERS
Roscoe A. Pike, Grand Island, and William T. Black, Buffalo, N.Y., assignors to Union Carbide Corporation, a corporation of New York
No Drawing. Filed Dec. 10, 1956, Ser. No. 627,122
6 Claims. (Cl. 260—448.2)

This invention relates, in general, to the synthesis of novel organosilicon compounds. More particularly, the invention contemplates the provision of new organosilane derivatives containing, among other possible functional groups, a carboalkoxy functional group which is linked to the silicon atom through an aliphatic hydrocarbon substituent in a position removed from the silicon nucleus by one or two carbon atoms of the aliphatic linkage, i.e., alpha- or beta-substituted along a silicon-bonded ethylene or ethylidene chain, or substituted ethylene or ethylidene chain. The invention further contemplates the provision of a unique process for producing compounds of the general class described, as well as processes for the production of carboxy- and carboalkoxy-functional polysiloxane derivatives of such compounds.

Heretofore, a number of organosilicon compounds containing silicon-substituted carboxylated radicals have been produced by the addition, in the presence of a peroxide catalyst, of unsaturated aliphatic or cyclic monoesters and diesters to halogen-, hydrocarbon-, or halogenated hydrocarbon-substituted silanes containing at least one silanic hydrogen bond, to provide a carboxylated silane which may be hydrolyzed to produce a corresponding siloxane. It has been postulated by prior investigators that the foregoing addition reaction is unsatisfactory as applied to those aliphatic and cyclic unsaturated esters in which the unsaturated linkage is so positioned that a functional carbonyl group will be substituted less than three carbon atoms from the silicon nucleus following the ester-silane reaction, as would be the case, for example, when esters of acrylic acid are employed as starting materials. That is to say, as developed heretofore, the process is reported to be inherently limited to the production of silanes in which the carboalkoxy substituents are positioned no closer to the silicon atom than the gamma carbon atom of the silicon-bonded connecting chain or ring structure. Since the hydrolytic instability of alpha and beta chloroalkyl silanes has been demonstrated by numerous workers, on the basis of results obtained heretofore, with acrylate systems in the foregoing ester-silane addition reaction, one might well assume that all organic substituents substituted alpha or beta to the silicon atom would show this same instability.

As far as is known, in all prior investigations reported in the literature on the use of acrylate systems in the ester-silane addition reaction, methyl acrylate has been employed as the ester reactant. The two possible products of such a reaction may be represented in general by the following equations:

(1)
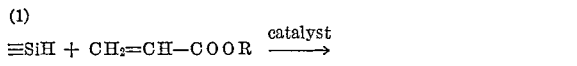

(2)
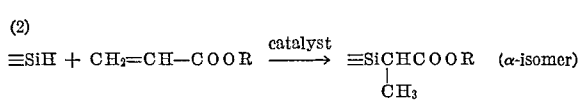

It is feasible to assume that the acrylic esters were found to give unsatisfactory results in prior systems which utilized a peroxide catalyst, possibly due in part to the excessive homopolymerization of the acrylates, in that, the preparation of polyacrylates by free radical polymerizations (peroxide catalyst) is a well established mechanism. On the other hand, it has been reported, also that the additions of methyldichlorosilane and trichlorosilane to methylacrylate in the presence of a platinum catalyst and without a solvent, yield the alpha-adducts (Equation 2) exclusively, and that the resulting chlorosilanes are unstable in water and form resinous solids.

The present invention is based, in part, upon our discovery that contrary to the generally accepted findings summarized above, under proper conditions the addition of hydrogen-containing silane monomers to acrylic esters can be effected with the mode of addition being directed to the formation of high yields of the beta-adducts, and that the hydrolysis products of the resulting chlorosilanes are stable and can be distilled. Thus, our investigations have demonstrated that by employing ethylacrylate, for example, and conducting the ester-silane addition reaction within a solvent system preferably consisting of an aliphatic, aromatic or halogenated aliphatic solvent, the beta-adducts can be produced in nearly quantitative yields.

Further, it has been shown that with esters of methacrylic acid, silanic hydrogen-containing chlorosilanes, as for example, trichlorosilane, methyldichlorosilane and the like, add to give only beta-addition products with or without the presence of a solvent. However, the use of solvents is preferred during such reactions as they serve to reduce formation of polymethylmethacrylate esters (homopolymerization) and, in addition, provide a means for absorbing the exothermic heat of reaction caused by the addition.

Specifically, the process of the invention contemplates the addition of silanes as represented in general by the formula:

(3) $\quad R_aH_bSiX_{4-a-b}$ wherein R represents a monovalent hydrocarbon radical, including alkyl and aryl radicals and substituted alkyl and aryl radicals; X represents a halogen or alkoxy substituent; (a) has a value from 0 to 2 inclusive and preferably a value of from 0 to 1; and (b) is an integer from 1 to 3 inclusive—to esters of acrylic acid as represented in general by the formula:

(4) $\quad ROOC\overset{R^3}{\underset{|}{C}}=\overset{R^3}{\underset{|}{C}}H$ wherein R represents a monovalent hydrocarbon radical, including alkyl or aryl radicals, either unsubstituted, or substituted with such groups as halogen, nitro, amino, ethers, ketones, aldehydes, etc.; and $R^3$ represents hydrogen, or monovalent hydrocarbon radicals selected from the group consisting of alkyl and aryl or substituted alkyl and aryl radicals i.e. methyl— in a solvent system of the general class described, to produce a silane ester monomer of the type represented in general by the formula:

(5) $\quad [(ROOC)R^1]SiR^2_aX_{3-a}$ wherein R represents an alkyl or aryl radical, either unsubstituted, or substituted with groups such as halogen, nitro, amino, esters, ketones, aldehydes, etc.; $R^1$ represents an ethylene or ethylidene radical, either unsubstituted, or substituted with alkyl or aryl, or substituted alkyl or aryl radicals i.e. methyl (cf. $R^3$); $R^2$ represents a member selected from the group consisting of hydrogen, or alkyl, aryl or $[(ROOC)R^1]$ radicals; X represents a halogen or alkoxy substituent; and (a) has a value from 0 to 2 inclusive and preferably a value of from 0 to 1.

In general, the process of the invention is carried out by the addition of the acrylic ester to a refluxing mixture of the silane, in the presence of a platinum catalyst, within a solvent system of the class described hereinafter; with subsequent recovery of the silane ester monomer preferably being effected by application of vacuum distillation techniques. As is evident, the terms "acrylic ester" or "acrylate" as employed throughout this specification are intended to encompass substituted acrylic esters as well as those which are unsubstituted, unless otherwise specifically indicated.

As demonstrated by the experimental data presented hereinafter (Table II), numerous solvents were tested by us in an effort to determine the effect of the solvent on the ratio of beta- to alpha-adducts when employing unsubstituted acrylic esters. We have found that whereas any inert liquid organic solvent in which the reactants are mutually soluble may be employed within the process of the invention, in general, the chlorinated aliphatic saturated or unsaturated hydrocarbons, aromatic hydrocarbons and aliphatic cyclic and linear ethers are preferable solvents for the addition reaction, whereas acetonitrile was found to inhibit the reaction completely. It is believed, however, that other nitriles should form operative solvents for purposes of the invention since acrylonitrile and allylcyanide, for example, are known to react with chlorosilanes in the presence of a platinum catalyst. Furthermore, while certain solvents provide higher ratios of beta- to alpha-adducts, as, for example, tetrahydrofuran, they also cause excessive polymerization of the acrylates and therefore require the use of higher concentrations of polymerization inhibitors in order to retard the formation of this by-product.

The effect of solvent with respect to the extent of homopolymerization of the substituted acrylate esters, as for example the methacrylate ester, is quite noticeable. Although the use of solvents to retard the formation of alpha-addition products is not necessary as little if any are formed, it does retard the extent of homopolymerization of the methacrylate ester.

We prefer to operate in all instances with a polymerization inhibitor present within the reaction mixture and may employ any of the conventional phenolic inhibitors such as hydroquinone or "Ionol" (2,6-ditertiarybutyl-4-methyl-phenol) for this purpose. Usually, the acrylates as supplied commercially will contain hydroquinone in concentrations with in the range 0.25 to 1.0 percent by weight, and this is not removed for purposes of the invention, but additional quantities of inhibitor may be added to the reaction mixture in concentrations within the range 0.25–5.0 percent by weight, and, preferably within the range of 1.0–2.0 percent by weight, based on total reactants.

Any of the commercially available forms of platinum catalyst can be employed in the process of the invention, including, for example, platinum on charcoal or asbestos, or platinum black. In actual practice, we have employed a heterogeneous catalyst consisting of two percent platinum on gamma-alumina in a concentration of two per cent by weight, based on total reactants, but any other concentration within the range 0.02–5 percent by weight can be employed with satisfactory results.

The solvent and silane are heated initially to the reflux temperature of the silane so that the starting reaction temperature is usually determined in this manner although any temperature within the range of 20–50° C. is satisfactory, and the preferred range is 40–50° C. As the acrylate is added to the silane-solvent system the temperature rises depending upon the rate of addition of the acrylate since the reaction is exothermic in nature, but the maximum temperature is usually determined by the reflux temperature of the system. After the addition of the acrylate, the mixture can be heated for an additional one-half hour to ten hours, but one to two hours is usually sufficient and is preferred operating procedure. We prefer to employ a solvent having a boiling point of at least 100° C., conducting the reaction at temperatures within the range 100–120° C., but with solvents of lower boiling points the reaction mixtures are refluxed at the boiling point of the solvent, and for all practical purposes the reaction can be conducted at any temperature within the range 50–250° C.

We have further found that, in general, the greater the dilution at which the reaction is conducted, the higher is the ratio of beta- to alpha-adducts, and that where methacrylate esters are employed the smaller the amount of homopolymerization. The tabulated data set forth hereinafter (Table I) demonstrate the increase in formation of the beta-adducts and decreases in formation of the alpha-adducts as the dilution of the reaction system is increased when using nonsubstituted acrylic acid esters. While we prefer to operate with a ratio of solvent to acrylate of four-to-one (4:1), we have found that ratios within the range from one-to-one (1:1) to ten-to-one (10:1) substantially reduce the formation of the unstable alpha-adduct and that where methacrylate esters are employed the smaller the amount of homopolymerization.

In effecting purification of the beta-adducts, we have found that the conventional procedure involving stripping-off the solvent and distilling the residue through an effective distillation column provides a good separation of the respective addition products. Alternatively, where unsubstituted acrylates are employed we have also found that when a crude mixture of an alpha and beta-adduct is heated to a temperature within the range of approximately 150–160° C. for several hours, the alpha-adduct can be decomposed leaving essentially the pure beta-compound which may be further purified by application of conventional distillation techniques.

The chlorosilane monomers, beta-carbethoxyethyltrichlorosilane and beta-carbethoxyethylmethyldichlorosilane, obtained by reaction of ethylacrylate with trichlorosilane and methyldichlorosilane, respectively, may be readily esterified with ethanol to yield the corresponding beta-carbethoxyethylethoxysilanes. In a similar manner, beta-carbomethoxyethylmethyldichlorosilane, obtained by the addition of methyldichlorosilane to methyl acrylate, may be esterified with ethanol to yield the mixed ester, beta-carbomethoxyethylmethyldiethoxysilane, and in the same manner the substituted monomeric chlorosilanes as for example beta-carbethoxypropyltrichlorosilane and beta-carbethoxypropylmethyldichlorosilane are obtained by the reaction of trichlorosilane and methyldichlorosilane with ethyl methylacrylate respectively. Such substituted chlorosilanes can be readily esterified to produce the corresponding alkoxysilanes by the reaction with an alkanol. Thus, beta-carbethoxypropyltriethoxysilane can be prepared by reacting beta-carbethoxypropyltrichlorosilane with ethanol. Depending upon the amount of alcohol employed during the reaction the starting substituted chlorosilanes can be either partially or completely esterified. For example, beta-carbomethoxypropylmethylchloroethoxysilane can be prepared by reacting 1 mole of beta-carbomethoxypropylmethyldichlorosilane with 1 mole of ethanol. In general, the novel products of the invention may be transesterified with a variety of alcohols, or reacted with acids and esters to yield silanes and siloxanes useful as lubricants, cosmetics, ultra-violet absorbers, chelating compounds, and anti-foam agents. The ester substituents, per se, can be reacted to yield a plurality of new silicone carbofunctional materials such as amides, alcohols, and ketones. Furthermore, the novel silane monomers of the invention may be hydrolyzed, under conditions customarily employed for the hydrolysis of organic esters, to produce carboxylic acid substituted siloxanes. In general, this may be effected by refluxing the silane with an aqueous alcoholic alkaline solution. Alternatively, the silanes can be hydrolyzed to yield hydrolyzates which may be distilled for the separation and recovery of the corresponding pure cyclopolysiloxanes. The carboalkoxy- and carboxy-functional siloxanes prepared from the silane monomers of the invention may be copolymerized with other siloxanes in the presence of a siloxane bond-rearranging catalyst to yield a variety of organo-functional silicones.

The novel beta-carbalkoxypropylsilanes of the present invention can be depicted graphically by the following structural formula:

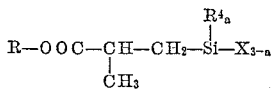

wherein R is a monovalent hydrocarbon radical; $R^4$ is hydrogen, a monovalent hydrocarbon radical, or a radical of the formula

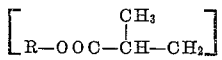

X is a halogen or an alkoxy radical; and has a value of 0 to 2. The preparation of these silanes does not, of course, require the presence of a solvent. Such silanes, particularly these beta-carbalkoxypropylalkoxysilanes find use as sizes for fibrous glass materials employed in combination with thermosetting resins of the polyester type to form composite articles such as laminates. Illustrative of these silanes are beta-carbethoxypropylmethyldichlorosilane, beta-carbethoxypropylmethyldiethoxysilane, beta-carbethoxypropyltrichlorosilane, and beta-carbethoxypropylthiethoxysilane.

Our beta-carbalkoxypropylsilanes also find use as the starting materials in the production of novel beta-carboxypropylpolysiloxanes and beta-carbalkoxypropylpolysiloxanes containing the unit formula:

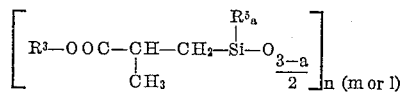

wherein $R^3$ is hydrogen or a monovalent hydrocarbon radical; $R^5$ is hydrogen, a monovalent hydrocarbon radical or a radical of the formula

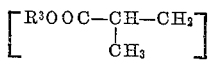

$a$ has a value of 0 to 2; and $n$ is any integer greater than one. Thus, for example, the integer can be at least 3 as further represented by $m$, or at least 5 as represented by $l$. Thus, not only high molecular weight polysiloxanes but also, for example, the cyclic trimers, cyclic tetramers, cyclic pentamers and mixtures thereof, as well as hydrolyzates of the starting monomers can be prepared by the practice of our invention. Thus, hydrolyzates can be represented by the above formula in the absence of the symbols $n$, $m$ or $l$. These polysiloxanes can be of the cyclic and linear type or of the cross-linked type depending on the number of functional groups present in the starting monomeric material. By way of illustration, the cyclic and linear beta-carbalkoxypropylsiloxanes can be prepared by the hydrolysis of a difunctional beta-carbalkoxypropylsilane. More specifically, the cyclic trimer, tetramer and pentamer of beta-carbethoxypropylmethylsiloxane can be prepared by adding either beta-carbethoxypropylmethyldichlorosilane or beta-carbethoxypropylmethyldiethoxysilane to water. The hydrolysis of the difunctional chlorosilanes is catalyzed by the presence of the evolved hydrochloric acid. On the other hand, when difunctional alkoxysilanes are hydrolyzed it is desirable to catalyze the reaction by the use of a mineral acid as for example, hydrogen chloride. The beta-carbalkoxypropylsiloxanes of the cross-linked variety are prepared by hydrolysis processes similar to those described above with the exception that a trifunctional substituted silane is employed as the starting material.

The hydrolysis reaction can be carried out within a liquid organic compound which is not reactive with water or with our starting silane, but in which compound the starting silane is soluble. We can employ as solvents for the reaction the aromatic hydrocarbons as for example, benzene, toluene and the like, the aliphatic ethers as for example diethyl ether, diisopropyl ether, the chloroalkyl hydrocarbons as for example, tetrachloroethylene and the like.

The temperature at which the hydrolysis reaction can be carried out is not narrowly critical and can vary over a wide range. We prefer to employ temperatures of from about 0° C. to about 40° C. Temperatures above and below the preferred range can also be employed, however, no advantage commensurate therewith is obtained.

In preparing the beta-carbalkoxypropylpolysiloxanes of our invention the hydrolysis process is preferably conducted in the presence of an amount of water sufficiently in excess of that required for hydrolysis so that the concentration of the acid catalyst if employed is less than 6 percent by weight. When the hydrolysis process is conducted in the presence of a catalyst and the catalyst concentration is above 6 percent by weight of the reaction medium, hydrolysis of the carbalkoxy group commences to occur. By increasing the concentration of the catalyst complete hydrolysis of the carbalkoxy group to a carboxy group occurs. Thus, we can prepare as new compositions of matter beta-carboxypropylpolysiloxanes which compounds can be of the cyclic, linear or trifunctional variety.

Illustrative of the novel polysiloxanes of the present invention are the following: beta-carbethoxypropylpolysiloxane, beta-carbethoxypropylmethylpolysiloxane, beta-carboxypropylpolysiloxane, beta-carboxypropylmethylpolysiloxane, beta-carbethoxypropylmethylsiloxane cyclic trimer, beta-carbethoxypropylmethylsiloxane cyclic tetramer, beta-carbethoxypropylmethylsiloxane cylic pentamer, beta-carboxypropylmethylsiloxane cyclic trimer, beta-carboxypropylmethylsiloxane cyclic tetramer and beta-carboxypropylmethylsiloxane cyclic pentamer.

Novel compositions produced in accordance with the practice of the present invention are, for example, mixtures containing cyclic trimers, cyclic tetramers, and cyclic pentamers of each of beta-carbethoxypropylmethylsiloxane, and beta-carboxypropylmethylsiloxane.

The beta-carbalkoxypropylpolysiloxanes and the beta-carboxypropylpolysiloxanes described herein also find use as sizes for fibrous glass materials employed in combination with thermosetting resins of the polyester type. Thus, water alcohol solutions of beta-carbalkoxypropylalkoxysilanes or such solutions of beta-carbalkoxypropylpolysiloxane as well as their corresponding beta-carboxypropylpolysiloxanes can be employed to coat fibrous glass materials, heating such coated materials to dry the coating thereon and subsequently form laminates with polyester resins and curing the prepared laminates.

The trifunctional beta-carbalkoxypropylpolysiloxanes and beta-carboxypropylpolysiloxanes of our invention also find use as coating materials when completely cured. The cyclic and linear beta-carbalkoxypropylpolysiloxanes and beta-carboxypropylpolysiloxanes of our invention also find use as lubricants. Most suitable for use as lubricant oils are the linear beta-carbalkoxypropylpolysiloxanes and beta-carboxypropylpolysiloxanes as well as copolymers of such siloxanes with dihydrocarbon substituted polysiloxanes. Such polymers and copolymers can be graphically depicted by the following structural formula:

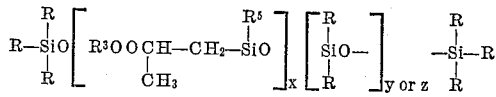

wherein R represents a monovalent hydrocarbon group; $R^3$ is hydrogen or a monovalent hydrocarbon radical; $R^5$ represents hydrogen, a monovalent hydrocarbon radical, or a radical of the formula

and $x$, $y$ and $z$ are integers, with $x$ having a value of at least 1 and preferably of at least 4; and $y$ can have any value including 0, and $z$ is an integer having a value of at least 1 and preferably 5. These polymers and copolymers can have, illustratively, a molecular weight in the range of 300 to 500,000 and contain from 0.001 to 92 weight percent (wt. %) of carboxypropylmethylsiloxy units.

Linear-end-blocked polysiloxanes of the above type can be prepared by either a cohydrolysis process or by an equilibration process. Cohydrolysis processes for preparing such end-blocked polysiloxanes include the cohydrolysis and cocondensation of a difunctional beta-carbalkoxypropylalkoxysilane or the corresponding chlorosilane which can be represented by the formula:

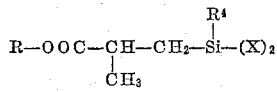

wherein R is a monovalent hydrocarbon radical; $R^4$ is hydrogen, a monovalent hydrocarbon radical or a radical of the formula

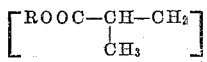

and X is halogen or an alkoxy radical; with a monofunctional trihydrocarbon substituted silane of the general formula

wherein R is as represented above and Hal is halogen, i.e. trimethylchlorosilane. The hydrolysis and condensation steps are carried out in the manner described above.

To prepare copolymeric polysiloxanes which contain dihydrocarbon siloxane units in addition to the beta-carbalkoxypropylsiloxane or beta-carboxypropylsiloxane units, a difunctional silane of the formula

wherein R and Hal are as described above, such as dimethyldichlorosilane, is added to the hydrolysis medium.

To prepare the polysiloxane oils of our invention by an equilibration process, a hydrolyzate of a difunctional beta-carbalkoxypropylsilane, which comprises a mixture of linear and cyclic beta-carboxypropylsiloxanes or beta-carbalkoxypropylsiloxanes or the pure linear or cyclic materials themselves, such as may be represented by the formula:

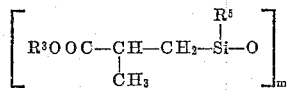

wherein $R^3$ is hydrogen or a monovalent hydrocarbon radical; $R^5$ is hydrogen, a monovalent hydrocarbon radical or a radical of the formula

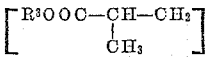

and m is an integer having a value of at least 3, are heated in the presence of an acid catalyst with compounds containing trihydrocarbon substituted siloxane units (end-blocking units) as for example, hexamethyldisiloxane and the like, and with or without cyclic dihydrocarbon substituted siloxanes such as the cyclic tetramer of dimethylsiloxane.

Compounds which contain trihydrocarbon substituted siloxane units suitable for use in our process for providing a means to control the length of the polymer chains can be graphically depicted by the structural formula:

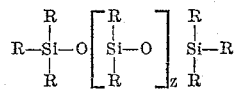

wherein R represents a monovalent hydrocarbon radical and z is an integer of at least 1 and preferably 1 to 8.

In conducting equilibration processes we prefer to employ as the acid catalyst sulphuric acid although other starting materials can also be employed. The amount of catalyst is not narrowly critical and can vary over a wide range. We can employ with good results an acidic catalyst in an amount of from as little as 0.05 to as much as 1 percent by weight of the reactants.

The temperatures at which the equilibration process is conducted varies over a wide range. We prefer to employ temperatures of from about 70° C. up to about 100° C. although temperatures above and below the range can be employed.

It is believed that the invention may be best understood by reference to the following specific examples which describe the preparation of typical compounds in accordance with the foregoing principles and procedures.

*Example I.—Preparation of Alpha- and Beta-Carbethoxyethylmethyldichlorosilanes by Addition of Methyldichlorosilane to Ethyl Acrylate*

A two-liter, three-necked flask equipped with reflux condenser, mechanical stirrer and dropping funnel was charged with 9.0 grams (2 percent by weight) of two percent platinum on gamma-alumina catalyst, 4.5 grams (1 percent by weight) of "Ionol" polymerization inhibitor, 800 grams of Perclene tetrachloroethylene—four times the weight of ethyl acrylate to be used), and 253 grams (2.2 moles, 10% excess) of methyldichlorosilane. The mixture was brought to reflux and 200 grams (2.0 moles) of ethyl acrylate were added with stirring over a period of one hour and fifteen minutes. The temperature of reaction rose to approximately 100° C. during the addition. After the acrylate addition was complete, the mixture was heated with stirring at 100–110° C. for four hours, cooled, and the catalyst removed by filtration. The solvent was stripped off under reduced pressure and the residue was distilled through a fifty (50) centimeter Vigreux column to give 303 grams (70.5 mole-percent conversion based on ethyl acrylate) of adduct. The distillate consisted of two fractions:

(1) A small portion of boiling point 57–67° C. (10 mm.) containing a mixture of the alpha- and beta-adducts; and
(2) The balance of the distillate of boiling point 70–82° C. (90 mm.) containing the beta-adduct and some polyethyl acrylate.

Fractionation through a 20-plate column yielded the desired pure beta-isomer, the structure of which was verified by infra-red analysis. The following analytical and physical data were obtained for the compound:

Boiling point _____ 49.5° C./4.0 mm.
Refractive index ($n_D^{25°\,C.}$) _____ 1.4389

| ($C_6H_{12}SiO_2Cl_2$) | C, percent | H, percent | Si, percent | Cl, percent |
|---|---|---|---|---|
| Calculated | 33.5 | 5.6 | 13.0 | 33.0 |
| Found | 33.4 | 6.0 | 12.4 | 32.8 |

A series of similar experiments were conducted with different solvents and the results of these are presented in Table II.

*Example II.—Purification of Beta-Carbethoxyethylmethyldichlorosilane by Decomposition of Alpha-Carbethoxyethylmethyldichlorosilane With Heat*

A mixture of α- and β-carbethoxyethylmethyldichlorosilane, in amount of 641 grams (approximately 36% α and 74% β), was placed in a one-liter distilling flask. The flask was fitted to a 50 centimeter Vigreux column and heated to 160° C. for three (3) hours. Throughout this period 187.5 grams of material (B.P. 82–93° C.

at 740 mm.) were collected. Stripping at reduced pressure gave an additional 8.0 grams. Distillation of the residue at reduced pressure gave 381 grams of distillate (B.P. 43–49° C./4 mm.); $n_D^{25°\ C.}$ 1.4370–1.4389) consisting of 6.4% alpha- and 93.6% beta-carbethoxyethylmethyldichlorosilane. The residue, amounting to 68 grams, accounted for the 16.6% calculated loss of the beta-isomer. The experiment demonstrates that the beta-isomer can be readily purified by decomposing the alpha-isomer with heat followed by distillation of the purified beta-isomer.

*Example III.—Preparation of alpha- and Beta-Carbethoxyethyltrichlorosilanes by Addition of Trichlorosilane to Ethyl Acrylate*

A three-liter steel pressure vessel was charged with 187 grams (1.1 moles) of tetrachlorosilane, 298 grams (4.4 moles) of trichlorosilane, 800 grams of Perclene, 18.4 grams of two percent by weight platinum gamma-alumina, and 9.0 grams of Ionol. The vessel was sealed and the contents were heated to 70° C. with rocking. Thereafter, ethyl acrylate, in amount 400 grams (4.0 moles), was added by injection over a one hour interval. After the addition was completed, the contents were heated to 120–140° C. for one and one-half hours, cooled and transferred to a three-liter distilling flask. Solvent and lights were removed by stripping at reduced pressure. The beta-isomer was obtained in 67 mole percent yield (based on ethyl acrylate) and was contaminated with 5 percent by weight of the alpha-isomer and 5 percent by weight of polyethyl acrylate. (B.P. 81° C./4.0 mm.–84° C./3.4 mm.–73.0° C./1.3 mm.; $n_D^{25°\ C.}$ 1.4440–1.4453. The structure and percent by weight of both contaminants were verified by infra-red analysis. The pure beta-isomer was separated and recovered by redistillation.

The following analytical data were obtained with the compound.

| | C, percent | H, percent | Si, percent | Cl, percent |
|---|---|---|---|---|
| Calculated ($C_5H_9SiO_2Cl_3$) | 25.5 | 3.9 | 11.9 | 45.2 |
| Found | 25.0 | 3.6 | 12.0 | 45.0 |

Boiling point _____ 45° C. (0.40 mm.)
Refractive index ($n_D^{25°\ C.}$) _____ 1.4457

*Example IV.—Preparation of Beta-Carbethoxyethyldichlorosilane by Addition of Dichlorosilane to Ethyl Acrylate*

A three-liter stainless steel pressure vessel was charged with 18.4 grams of two percent platinum on gamma-alumina, 9.0 grams of "Ionol," 202 grams (2.0 moles) of dichlorosilane and 800 milliliters of Perclene. Ethyl acrylate, in amount of 400 grams (4.0 moles) was fed in by continuous injection over a period of one hour and forty-five minutes while the temperature of the reaction mixture was maintained at 100° C. Thereafter, the contents were heated with rocking at 110–120° C. for two and one-quarter hours, cooled and filtered into a three-liter distilling flask. Lights and solvent were removed by stripping at reduced pressure. Distillation of the residue at reduced pressure through a Vigreux column gave a twenty percent by weight yield of distillable adduct consisting principally of the desired compound plus some polyethylacrylate as verified by infra-red analysis (B.P. 56–60° C./0.1 mm.; $n_D^{25°\ C.}$ 1.4345–1.4365). Recovery of the pure beta-isomer was effected by redistillation.

*Example V.—Preparation of Alpha- and Beta-Carbomethoxyethylmethyldichlorosilane by Addition of Methyldichlorosilane to Methyl Acrylate Without Solvent*

A 500 milliliter, three-necked round-bottomed flask equipped with reflux condenser, mechanical stirrer and dropping funnel, was charged with 127 grams (1 mole) of methyldichlorosilane, and 4.0 grams of two percent platinum on gamma-alumina. The mixture was brought to reflux and 86 grams (1 mole) of methyl acrylate containing 1.2 grams of "Ionol" was added dropwise with stirring over a period of 1.5 hours. After the addition was complete, the mixture was heated an additional hour. The solids were collected on a Büchner funnel and the filtrate distilled through a glass-helix packed column under reduced pressure. The following two fractions were obtained:

(1) Boiling point 39° C.–45° C. (1.5–2.0 mm.) (8.5 percent by weight yield), and
(2) Boiling point 45°–51° C. (2.0 mm.) (56 percent by weight yield based on methylacrylate).

The first compound was identified as beta-carbomethoxyethylmethyldichlorosilane by infra-red analysis. The hydrolysis product of this compound has been identified as $[MeOOC(CH_2)_2SiMeO]_x$.

The second compound was identified as alpha-carbomethoxyethylmethyldichlorosilane by its infra-red spectrum. This material when hydrolyzed by addition to a mixture of diethyl ether and ice gave methylpolysiloxane as identified by microscopic examination.

*Example VI.—Preparation of Alpha- and Beta-Carbomethoxyethylmethyldichlorosilane by Addition of Methyldichlorosilane to Methyl Acrylate in Perclene Solvent*

A 500 milliliter round-bottomed flask equipped with reflux condenser, dropping funnel, and mechanical stirrer, was charged with 67 grams (0.56 mole) of methyldichlorosilane, 4.0 grams of two percent platinum on gamma-alumina, 1.2 grams of "Ionol," and 50 grams of Perclene (tetrachloro ethylene). The contents were heated to reflux (41° C.) and 50 grams (0.56 mole) of methyl acrylate were added dropwise with stirring over a period of one and one-half hours. The mixture was then stirred an additional hour at 100–105° C. The solids were collected on a Büchner filter and the Perclene solvent was separated from the filtrate under reduced pressure. The residue was distilled through a glass-helix packed column to yield 66.5 grams of mixed product (B.P. 42° C./1.7 mm.–51° C./0.5 mm.; $n_D^{25°\ C.}$ 1.4386–1.4425) which was found by infra-red analysis to consist of fifty percent of the alpha-adduct and fifty percent of the beta-adduct.

A similar run using 200 grams of Perclene per 50 grams of methyl acrylate gave sixty percent beta- and forty percent alpha-adduct (see Table III below). Analytically pure samples of both chlorosilanes were obtained by redistillation.

The following analytical data were obtained with the respective pure compounds:

(A)          $MeOOC(CH_2)_2SiMeCl_2$

| | C, percent | H, percent | Si, percent | Cl, percent |
|---|---|---|---|---|
| Calculated ($C_5H_{10}SiO_2Cl_2$) | 29.9 | 4.97 | 13.95 | 35.3 |
| Found | 29.5 | 5.20 | 14.4 | 35.3 |

Boiling point _____ 60.5° C. (9.0 mm.)
Refractive index ($n_D^{25°\ C.}$) _____ 1.4389

(B)          $\underset{|}{CH_3}$
         $MeOOCHSiMeCl_2-$

| | C, percent | H, percent | Si, percent | Cl, percent |
|---|---|---|---|---|
| Calculated ($C_5H_{10}SiO_2Cl_2$) | 29.9 | 4.97 | 13.95 | 35.3 |
| Found | 30.3 | 5.1 | 14.4 | 34.7 |

Boiling point _____ 73–74° C. (7.0 mm.)
Refractive index ($n_D^{25°\ C.}$) _____ 1.4420

Example VII.—Preparation of Beta-Carbethoxyethylphenyldichlorosilane by Addition of Phenyldichlorosilane to Ethyl Acrylate A one-liter, three-necked flask equipped with mechanical stirrer, reflux condenser and dropping funnel was charged with 97.4 grams (0.55 mole) of phenyldichlorosilane, 200 grams of Perclene, 14 grams of "Ionol," and 2.5 grams of platinum on gamma-alumina (2% Pt). The mixture was heated to reflux and 50 grams of ethyl acrylate (0.5 mole) was added dropwise over a period of one hour. The reaction mixture was stirred at reflux for an additional two and one-half hours, cooled, filtered and distilled through a 50 centimeter Vigreaux column at reduced pressure. A fraction boiling at 106° C. (0.25 mm.) ($n_D^{25°\,C.}=1.5120$) was obtained in 72.5 mole percent yield based on ethyl acrylate, and its structure confirmed as that of the desired compound by infra-red analysis. The following analytical data were obtained with the compound:

|  | C, percent | H, percent | Si, percent | Cl, percent |
|---|---|---|---|---|
| Calculated ($C_{11}H_{14}SiO_2Cl_2$) | 47.6 | 5.1 | 10.5 | 25.2 |
| Found | 47.7 | 5.1 | 10.1 | 25.6 |

TABLE I.—EFFECT OF SOLVENT DILUTION ON THE RATIO OF BETA/ALPHA ADDUCT IN THE ADDITION REACTION OF METHYLDICHLOROSILANE TO ETHYL ACRYLATE IN PERCLENE SOLVENT (Pt/Al₂O₃ catalyst)

| Parts Solvent per part acrylate ester | Percent Conversion [5] | Percent by Weight of— | | Percent by Weight Polyester Impurity [3] |
|---|---|---|---|---|
| | | Alpha [1] | Beta [2] | |
| 0.0 | 72.0 | 22.5 | 74.5 | 3.3 |
| 0.5 | 68.6 | 25.4 | 72.6 | 2.0 |
| 1.0 | 70.0 | 19.0 | 78.5 | 2.5 |
| 2.0 | 70.6 | 9.4 | 87.4 | 3.2 |
| 4.0 | 66.3 | neg. | 97.9 | 2.1 |
| 4.0 [4] | 70.5 | 1.7 | 95.0 | 3.3 |

[1] EtOOCCH-SiMeCl₂.
[2] EtOOC(CH₂)₂-SiMeCl₂.
[3] Polyester impurity: A polymer of ethyl acrylate. Infrared spectrum indicates it is probably a dimer.
[4] Run made using 2.0 moles of each reactant whereas all others were made using 0.5 mole of each reactant.
[5] Percent conversion of charged acrylate ester to carbofunctional silane product.

TABLE II.—EFFECT OF VARIOUS SOLVENTS ON THE RATIO OF BETA/ALPHA ADDUCT IN THE ADDITION REACTION OF METHYLDICHLOROSILANE TO ETHYL ACRYLATE (Pt/Al₂O₃ CATALYST)

| Parts Solvent per part acrylate ester | Percent Conversion [4] | Percent by Weight of— | | Percent by Weight of Polyacrylate |
|---|---|---|---|---|
| | | Alpha [1] | Beta [2] | |
| 1 acetonitrile | 0 | | | |
| 1 trichloroethylene | 68.0 | 20.5 | 77.5 | 2.0 |
| 1 carbontetrachloride | 68.9 | 26.6 | 69.0 | 4.4 |
| 1 chloroform | 70.0 | 27.8 | 69.5 | 2.7 |
| 1 benzene | 76.0 | 32.0 | 65.0 | 3.0 |
| 1 tetrahydrofuran | 77.6 | 8.3 | 66.5 | 25.5 |
| 1 n-heptane | 74.5 | 22.0 | 76.7 | 1.3 |
| 1 n-heptane [3] | 60.0 | 26.5 | 71.4 | 2.1 |
| 4 toluene [3] | 66.0 | 12.9 | 85.7 | 1.4 |
| No Solvent | 72.0 | 22.2 | 74.5 | 3.3 |

[1] EtOOCCH-SiMeCl₂.
[2] EtOOC(CH₂)₂-SiMeCl₂.
[3] Runs made with 2 moles of each reactant. All others made with 0.5 mole of each reactant. All runs made under similar conditions with addition time of acrylate being 1 hr. and reflux time after addition 1 hr.
[4] Percent conversion of charged acrylate ester to carbofunctional silane product.

TABLE III.—EFFECT OF SOLVENT DILUTION ON THE RATIO OF BETA/ALPHA ADDUCT IN THE ADDITION REACTION OF METHYLDICHLOROSILANE TO METHYL ACRYLATE IN "PERCLENE" SOLVENT: (Pt/Al₂O₃ CATALYST)

| Parts Solvent per part acrylate ester | Percent Conversion [3] | Percent by Weight of— | |
|---|---|---|---|
| | | Alpha [1] | Beta [2] |
| 0 | 64 | 88 | 12 |
| 1 | 56 | 50 | 50 |
| 4 | 65 | 41 | 59 |

[1] MeOOCCH-SiMeCl₂.
[2] MeOOC(CH₂)₂-SiMeCl₂.
[3] Percent conversion of charged acrylate ester to carbo-functional silane product.

PREPARATION OF BETA-CARBETHOXYETHYL-SUBSTITUTED CYCLOPOLYSILOXANES

Example VIII.—Preparation of Beta-Carbethoxyethylmethylsiloxane Cyclic Trimer, Tetramer and Pentamer by Vacuum Hydrolysis of Beta-Carbethoxyethylmethyldichlorosilane A two-liter, three-necked flask equipped with reflux condenser, mechanical stirrer and dropping funnel was charged with 400 cubic centimeters of dry Perclene and 180 grams (0.84 mole) of beta-carbethoxyethylmethyldichlorosilane. A vacuum of 50–60 mm. pressure was applied to the system by means of a water aspirator. Distilled water, in amount 15.1 grams (0.84 mole), was then added with stirring over a period of one-half hour. After an additional one-half hour, an excess of two moles of water was added and the contents of the flask were heated to 50–60° C. The mixture was cooled, transferred to a separatory funnel and the Perclene layer washed with water and dilute sodium bicarbonate until neutral. The solvent was then distilled off under reduced pressure to yield 132.5 grams (99 percent by weight yield) of $[EtOOC(CH_2)_2Si(Me)O]_x$ ($n_D^{25°\,C.}=1.4450$).

Forty-five grams of the above hydrolyzate was distilled under reduced pressure through a three centimeter Vigreux column. The following fractions were obtained:

(I) B.P. 205–210° C. (0.8 mm.), $n_D^{25°\,C.}$ 1.4376 (yield 7.0 grams)

(II) B.P. 195–210° C. (0.5 mm.), $n_D^{25°\,C.}$ 1.4410 (yield 14.0 grams)

(III) B.P. 210–220° C. (0.5 mm.), $n_D^{25°\,C.}$ 1.4422 (yield 6.0 grams) (pot gelled after temperature reached 420° C.)

The infra-red spectrum for fraction I exhibited strong absorption due to COOEt, SiMe, and Si—O—Si. The Si—O—Si is substantially all tetramer with but a trace of trimer. The residual Si—OH was demonstrated. The following analytic data were obtained with the cyclic tetramer.

Molecular weight:
    Calculated _____ 640
    Found _____ 721

Saponification No.:
    Calculated ($C_6H_{12}SiO_3$) _____ 350
    Found _____ 265.8

Silicon:
    Calculated ($C_6H_{12}SiO_3$) _____percent__ 17.5
    Found _____ do____ 19.1

Fractions II and III both exhibited the presence of cyclic pentamer upon infrared analysis.

Example IX.—Preparation of Beta-Carbethoxyethylphenylsiloxane Cyclics by Hydrolysis of Beta-Carbethoxyethylphenyldichlorosilane Ninety (90) grams of beta-carbethoxyethylphenyldichlorosilane, dissolved in 100 cubic centimeters of isopropyl-ether, were admixed with vigorous stirring over a period of fifteen minutes within 500 cubic centimeters of isopropyl ether and 200 grams of crushed ice. The mixture was stirred an additional hour and thirty minutes, and the ether layer was separated, washed with water, dilute sodium bicarbonate solution and water until neutral. The ether solution was stripped of solvent under vacuum to give 34.5 grams of hydrolyzate. The hydrolyzate was then distilled in a "Hickman" molecular still to give 23 grams of distillable material of boiling point 200–350° C. (1–5μ), $n_D^{25° C.}$ 1.5406.

The infra-red spectrum showed strong COOEt, $SiC_6H_5$, Si—O—Si. The material consisted essentially of a mixture of the cyclic trimer and tetramer with a predominant amount of trimer. No Si—OH was present.

Saponification No.: Calculated—265. Found—250.

|  | C, percent | H, percent | Si, percent |
|---|---|---|---|
| Calculated | 57.4 | 6.64 | 13.3 |
| Found | 59.8 | 5.9 | 13.8 |

*Example X.—Preparation of Beta-Carbomethoxyethyldiethoxysilane by Esterification of Beta-Carbomethoxyethylmethyldichlorosilane*

One-hundred and ten (110) grams (0.55 mole) of betacarbomethoxyethylmethyldichlorosilane were charged into a one-liter, three-necked round-bottomed flask equipped with stirrer, reflux condenser and dropping funnel. A water aspirator vacuum was applied to the system (approx. 20 mm.) and 50.6 grams (0.1 mole) of absolute ethanol was added with stirring over a one-half hour period. After the addition was complete, an additional two moles of ethanol were added and the solution stirred for two hours. The solution was then heated to reflux for ¼ hour and the excess ethanol distilled off under reduced pressure. The residue was distilled through a glass-helix packed column to give 34 grams (28.5 percent by weight) of beta-carbomethoxyethylmethyldiethoxysilane. B.P. 65–66° C. (4.0 mm.), $n_D^{25° C.}$ 1.4097.

|  | C, percent | H, percent | Si, percent |
|---|---|---|---|
| Calculated ($C_9H_{20}SiO_4$) | 49.2 / 47.2 | 9.1 / 9.1 | 12.72 / 14.4 |

Infra-red analysis confirmed the structure as being that of the beta-adduct.

*Example XI.—Preparation of Beta-Carbethoxypropylmethyldichlorosilane*

(a) Addition of methyl dichlorosilane to ethyl methacrylate in the absence of a solvent: Methyldichlorosilane (280 grams) (2.0 moles), 2 percent platinum $Pt/Al_2O_3$ (aluminum oxide) (2 wt. percent) and Ionol (1 wt. percent) (4.6 grams) were charged to a 2-liter three-necked flask fitted with stirrer, thermometer, reflux condenser, and dropping funnel. The solution was brought to reflux with stirring and the ethyl methacrylate (2.0 moles) was added over a 2 hour period with reaction temperatures rising from 40° C. to 99° C. After the addition, refluxing was continued for 2 hours followed by cooling under an inert gas. The amber colored product was fractionated through a 60 cm. Vigreux column under reduced pressure. Yield of product was 53.5 percent of beta-adduct containing some polyethylmethacrylate. (Found hydrolyzable chlorine=29.6; theory=30.9).

(b) Addition of methyldichlorosilane to ethylmethacrylate in solvent: Methyldichlorosilane (2.0 moles) (230 grams), Perclene (912 grams) (4 times the weight of acrylate), 2 percent $Pt/Al_2O_3$ (9.2 grams) (2 wt. percent), and Ionol (1 wt. percent) 4.6 grams) were charged to a nitrogen purged 3-liter three-necked flask fitted with mechanical stirrer, thermometer, reflux condenser and dropping funnel. The soltuion was brought to gentle reflux with stirring and ethylmethacrylate (2.0 moles) 228 grams was added during a 2 hour period with reaction temperature rising from 70°–100° C. After the addition refluxing was continued for 2 hours followed by cooling under a nitrogen atmosphere. The crude product was fractionated through a 50 cm. Vigreux column under reduced pressure. Yield of product was 66.0 percent. Infra-red spectrum analysis showed the same to be principally beta-adduct. A sample was submitted for chemical analysis.

Found:

| | Percent |
|---|---|
| C | 37.1±0.5 |
| H | 6.4±0.3 |
| Si | 12.6±0.6 |
| Cl | 30.4±0.6 |

Calculated:

| | |
|---|---|
| C | 36.7 |
| H | 6.1 |
| Si | 12.2 |
| Cl | 30.9 |

(c) Physical properties of beta-carbethoxypropylmethyldichlorosilane:

Boiling point _____ 115°–117°/19 mm.
Refractive index, $n_D^{25° C.}$ _____ 1.4420.
Color _____ Water white.

*Example XII.—Preparation of Beta-Carbethoxypropylmethyldiethoxysilane*

(a) Reduced pressure esterification of beta-carbethoxypropylmethyldichlorosilane: Beta-carbethoxypropylmethyldichlorosilane (0.26 mole) (57.3 grams) was charged to a 600 ml. 3-necked flask fitted with dropping funnel, mechanical stirrer, and reflux condenser with a water aspirator attachment. Ethyl alcohol (23.0 grams) (0.5 mole) was added from the funnel with stirring and reduced pressure (aspirator) over a period of 2 hours. No external cooling was used. Stirring was continued for 1 more hour and 20 percent excess ethanol (4.6 grams) was slowly added. After stirring (still under reduced pressure) for ½ hour heat was applied and stripped to a pot temperature of 70° C. After cooling the clear yellow product was distilled through a 30 cm. column packed glass helices. A yield of product of 77.6 percent was obtained.

(b) Atmospheric pressure esterification of beta-carbethoxypropylmethyldichlorosilane: Beta-carbethoxypropylmethyldichlorosilane (94.0 grams) (0.41 mole) was charged to a 500 ml. 3-necked flask fitted with mechanical stirrer, thermometer, reflux condenser (with a gas bubbler attached) and dropping funnel. Ethyl alcohol (37.7 grams) (0.82 mole) plus a 20 percent excess of 7.6 grams was added over a period of ¾ hour with gentle heating to maintain the rate of reaction. After the addition heat was applied to 90° C. over a 3 hour period to strip hydrogen chloride. The flask was then cooled to room temperature under a nitrogen atmosphere, neutralized with anhydrous $NH_3$, diluted with diethyl ether and filtered. The crude ester was charged to a 100 ml. distilling flask and fractionated through a 60 cm. column packed with polysurface alumina. An overall yield of 74.6 percent product was obtained.

(c) Physical properties of beta-carbethoxypropylmethyldiethoxysilane:

Boiling point _____ 228°–230° (atmos. pres.) and 125°–128°/22 mm.
Refractive index, $n_D^{25° C.}$ _ 1.4170.
Color _____ Water white liquid.

(d) Stability tests: The diethoxy compound can be distilled at atmospheric pressure and is stable when distilled from a mixture of 20 wt. percent, 2 wt. percent sodium methylate or hydrochloric acid at atmospheric pressure.

Example XIII.—Preparation of Beta-Carbethoxy-propyltrichlorosilane (a) Addition of trichlorosilane to ethyl methacrylate in a pressure vessel: Trichlorosilane (500 grams), silicon tetrachloride (156 grams), Perclene (700 grams), and 2 percent $Pt/Al_2O_3$ (12.0 grams) were charged to a nitrogen purged 3-liter pressure vessel. The vessel was sealed and placed in an electric furnace. Heat was applied with rocking. At 180° C. (200 p.s.i.) ethylmethacrylate (350 grams) was injected over a 1 hour period. Heat was shut down and the vessel was cooled to room temperature with rocking overnight. The crude (wt.=1690 grams) was filtered and fractionated through a 60 cm. column packed with glass helices. A yield of 45.5 percent product was obtained. Infra-red spectrum showed beta-adduct with a trace of polyester.

(b) Physical properies of beta-carbethoxypropyltrichlorosilane:

Boiling point _____ 106°–108°/11 mm.
Refractive index, $n_D^{25°}$ C. _____ 1.4457.
Color _____ Water white liquid.

Example XIV.—Preparation of Beta-Carbethoxypropyl-triethoxysilane (a) Reduced pressure esterification of beta-carbethoxypropyltrichlorosilane: Beta - carbethoxypropyltrichlorosilane (124.8 grams) (0.5 mole) was charged to a 1 liter 3-necked flask fitted with mechanical stirrer, thermometer, dropping funnel and reflux condenser (with aspirator attachment). Ethyl alcohol (69.0 grams) (1.5 moles) plus a 20 percent excess (13.8 grams) was added with aspirator vacuum and stirring over a 1 hour period. No external cooling was used. The excess alcohol was added after stirring for 30 minutes and stirring continued for 1½ hours. Heat was employed to a pot temperature of 80° C. The crude product was cooled and distilled through a 60 cm. column packed with polysurface alumina under reduced pressure. Yield of triethoxy product was 94.0 percent. Infra-red spectrum showed no alpha-adduct or polyester present.

(b) Physical properties of beta-carbethoxypropyltriethoxysilane:

Boiling point _____ 243°–244° (atm. press.).
Refractive index, $n_D^{25°}$ C. ____ 1.4130.
Color _____ Clear water white liquid.

(c) Stability tests on beta-carbethoxypropyltriethoxysilane:

*Thermal.*—Beta-carbethoxypropyltriethoxysilane can be distilled at atmospheric pressure. B.P. 243° C.–244° C.

*Hydrolytic - base.*—Beta - carbethoxypropyltriethoxysilane was mixed with 20 wt. percent ethanol, 2 wt. percent sodium methylate and heated at 90° C. for two hours. It was then distilled at atmospheric pressure from the base with no Si—C cleavage.

*Hydrolytic - acid.*—Beta - carbethoxypropyltriethoxysilane was mixed with 20 wt. percent ethanol, 2 wt. percent anhydrous hydrochloric acid and distilled as above. No Si—C cleavage was obtained.

Example XV.—Preparation of Beta-Carbethoxy-propylmethylsiloxane

Into a 2 liter, 3-necked flask fitted with condenser, mechanical stirrer and dropping funnel were placed 100 grams (0.436 mole) of beta-carbethoxypropylmethyldichlorosilane ($n_D^{25}$ 1.4410) and 200 ml. of dry Perclene. At reduced pressure (from water aspirator) and with vigorous stirring was added 8.8 ml. of water in 10 minutes. After approximately 7 minutes of additional stirring 50 ml. of water was added and stirring under vacuum continued for 30 minutes. The layers were separated and the Perclene layer was washed with water and dilute $NaHCO_3$ solution until neutral. The Perclene was stripped at reduced pressure in a rotary stripper to yield 73.3 grams of a clear water white oil. (97 mole percent of theoretical.) The residue was charged to a Hickman molecular still and distilled at reduced pressure. The total distillate was 95 wt. percent of the original charge and contained approximately equal amounts of trimer and tetramer with the structure:

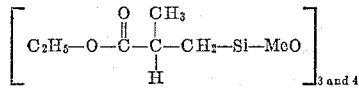

Refractive index, $n_D^{25°}$ C.

| $(C_7H_{14}SiO_3)_3$ | C, percent | H, percent | Si, percent | |
|---|---|---|---|---|
| Calculated | 48.3 | 8.1 | 16.1 | (322 Sap. No.; 523 Mol Wt.) |
| Found | 47.8 | 8.2 | 15.9 | (321 Sap. No. 553±55) |

Example XVI.—Preparation of Beta-Carboxy-propylsiloxane

Into a 1 liter, 3-necked flask, fitted with dropping funnel, mechanical stirrer and condenser was placed 100 ml. of diethyl ether and 100 ml. of water. With vigorous stirring at reduced pressure was added 94.0 grams (0.377 mole) of beta-carbethoxypropyltrichlorosilane over 30 minutes. The following day the mixture was stripped to solids. A mixture of 50 grams hydrochloric acid, 200 ml. water and 200 ml. of diethylene glycol diethylether was added and the contents were heated to reflux for 4 hours. The vapor temperature rose to 100° C. after 3 hours. The contents were stripped to solids on a rotary stripper at reduced pressure to yield 40 grams (after grinding) of a white free flowing powder. Neutralization equivalent—178 (139 theory).

Example XVII.—Preparation of Beta-Carboxypropyl-methylsiloxane

Into a 500 cc. 3-necked flask, fitted with thermometer magnetic stirrer and 50 cm. Vigreux column with distillation head was placed 32 grams (0.184 mole) of the cyclic trimer and cyclic tetramer of beta-carbethoxypropylmethylsiloxane, $n_D^{25°}$ C., 25 grams of concentrated HCl in 100 ml. $H_2O$ and 100 ml. of diethylene glycol diethyl ether. The contents were heated to reflux for 4 hours while collecting the ethanol-water azeotrope. The vapor temperature rose to 100° C. after 3 hours. The contents were stripped to solids on a rotary stripper to yield 27 grams of crude product. The crude was dissolved in dilute sodium hydroxide (approximately 1 N), and the solution extracted with two 200 ml. portions of diethylether. The water layer was acidified with 1 N-HCl and extracted with 2–200 ml. portions of diethyl ether. The ether layer was dried over calcium sulfate (anhydrous). Ether was removed by stripping at reduced pressure to yield 24 grams of a clear viscous resin.

Infra-red survey indicated the molecular structure to be

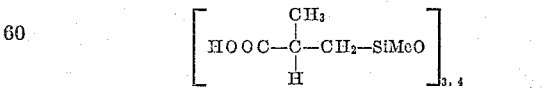

| $(C_5H_{10}SiO_3)_{3,4}$ | C, percent | H, percent | Si, percent | |
|---|---|---|---|---|
| Calculated | 41.1 | 6.85 | 19.2 | 384 Acid No. |
| Found | 42.3 | 7.0 | | 397 Acid No. |

Example XVIII.—Preparation of Beta-Carbethoxy-propylpolysiloxane

Twenty grams (0.072 mole) of beta-carbethoxypropyltriethoxysilane, 20.0 grams (1.11 mole) of water and 2 drops of conc. HCl were placed in a 100 ml. distilling flask and shaken for 10 minutes until a homogeneous solution was obtained. Some heat evolved during this period. The clear solution was allowed to stand at room temperature for 1 hour and was then placed in a 150° C. constant temperature bath for 2½ hours. 11.8 grams of a very viscous clear oil was obtained for a yield of 97.5 percent. A sample of this product was found to have the following characteristics: Saponification number, 338. (Found, ethoxy=27.0 percent due to carbethoxy, theoretical=26.9 percent.)

*Example XIX.—Preparation of Dimethylsiloxy Oil of a Molecular Weight of 1000 16 Weight Percent (Wt. Percent) Carboxypropylmethylsiloxy Units*

38.4 grams of dodecamethylpenta linear siloxane, 45.6 grams of the cyclic tetramer of dimethylsiloxane and 19.2 grams of hydrolyzate of linear and cyclic beta-carboxypropylmethyl siloxane containing 16 grams of beta-carboxypropylmethylsiloxy units, were charged into a 3-necked 500 cc. round bottomed flask fitted with a motor driven stirrer. The flask and contents were heated to 80° C. in an oil bath and the sulfuric acid added. The mixture was equilibrated for 3 hours at 80° C. The reaction product was allowed to cool to room temperature and 100 cc. of water added. The mixture was stirred and the silicone extracted with ether. The ether solution was washed with distilled water until the water washings were neutral to pH paper. The ether was evaporated off and 100 cc. of benzene added. The benzene and any residual water was removed by vacuum stripping at 80° C. for 1 hours. The viscosity at 25° C. was 117 centistokes (cs.).

*Example XX.—Preparation of a 5000 Mol Wt. Dimethyl Silicone Oil Containing 5 Wt. Percent of Beta-Carboxypropylmethylsiloxane Units*

7.68 grams of dodecamethylpenta linear siloxane, 6.6 grams of hydrolyzate of linear and cyclic beta-carboxypropylmethylsiloxane containing 5 grams of beta-carboxypropylmethylsiloxy units determined on the basis of equivalent weight, and 87.32 grams of the cyclic tetramer of dimethylsiloxane were mixed in a 500 cc. round bottom 3-necked flask fitted with a motor driven stirrer and heated to 80° C. in an oil bath with stirring. To this was added 0.25 gram of concentrated sulfuric acid and the heating and stirring continued for three hours to complete the equilibration. The flask was cooled to room temperature and 100 cc. of distilled water added, with stirring. The mixture was then extracted with diethyl ether and the ether solution washed with distilled water until it was neutral to pH paper. The ether was then evaporated off and 150 cc. of toluene added. The toluene and any residual water was then removed by vacuum evaporation. 92.4 grams of a water white oil was recovered, having a viscosity at 25° C. of 130 centistokes (cs.).

*Example XXI.—Preparation of a Dimethyl Silicone Oil of Approximately 5000 Mol Wt. and Containing 25 Wt. Percent Beta-Carboxypropylmethylsiloxy Units*

7.68 grams of dodecamethylpenta siloxane, 67.32 grams of the cyclic tetramer of dimethylsiloxane, and 28.0 grams hydrolyzate of linear and cyclic beta-carboxypropylmethylsiloxane containing 25 grams of beta-carboxypropylmethylsiloxy units determined on the basis of equivalent weight were mixed in a 500 cc. 3-necked round bottomed flask fitted with a motor driven stirrer and heated to 80–90° C. on a steam bath, with stirring. The sulfuric acid (0.25 gram conc. $H_2SO_4$) was added and the heating and stirring continued for 3 hours. The flask was then cooled to room temp. and 100 cc. distilled water added with stirring. The silicone was then dissolved in diethyl ether and the ether solution washed with distilled water until the washings were neutral to pH paper. The ether was then evaporated off and 150 cc. of toluene added. The toluene and any residual water was then removed by vacuum evaporation. 97.0 grams of a thick water white oil was recovered. This product had a viscosity at 25° C. of 2280 centipoises (cps.).

*Example XXII.—Preparation of a 1000 Mol. Wt. Dimethyl Silicone Oil Trimethyl Siloxy End-Blocked and Containing 16 Wt. Percent Betacarboxypropylmethylsiloxy Units*

33.6 grams of beta-carboxypropylmethylsiloxy units in a hydrolyzate of linear and cyclic beta-carboxypropylmethylsiloxane, 94.7 grams of the cyclic tetramer of dimethylsiloxane and 80.6 grams of dodecamethylpentasiloxane, were charged into a 1-liter 3-necked flask fitted with a mechanical stirrer and heated to 80° C. in an oil bath with stirring. The sulfuric acid (0.5 gram conc. $H_2SO_4$) was added and the heating and stirring continued for three hours. One hundred cc. of distilled water was then added and the mixture stirred for 1 hour to dilute the sulfuric acid and wash it out of the system. The silicone was then dissolved in diethyl ether and washed with distilled water until the water washings were neutral to pH paper. The ether was then evaporated off and 200 cc. of toluene added. The toluene and any residual water was removed by vacuum evaporation at 100° C. for three hours, 192 grams of an oil was recovered.

*Example XXIII.—Preparation of a 5000 Mol-Wt. Dimethyl Silicone Oil Containing 5 Wt. Percent β-Carbethoxypropylmethylsiloxy Units and End-Blocked With Trimethylsiloxy Units*

7.68 dodecamethylpentasiloxane, 87.32 grams of the cyclic tetramer of dimethylsiloxane and 5.00 grams beta-carbethoxypropylmethylsiloxane cyclic tetramer were charged to a 500 ml. round bottomed flask fitted with a motor driven stirrer and heated to 90° C. on an oil bath with stirring. The sulfuric acid (0.5 grams conc. $H_2SO_4$) was added and the equilibration run 3 hours at 80° C. with stirring. The silicone oil was cooled to room temperature, and 200 cc. of dilute $NaHCO_3$ added to kill the catalyst. The silicone was dissolved in diethyl ether and washed with distilled water until the water washings were neutral to pH paper. The ether was then evaporated off on a steam bath and 100 cc. of toluene added. The toluene and any residual water was then removed by vacuum stripping at 90–100° C. 45 grams of a water white oil was recovered having a viscosity at 25° C. of 186 cs.

*Example XXIV.—Preparation of a 5000 Mol. Wt. Dimethyl Silicone Oil Containing 25 Wt. Percent of Beta-Carbethoxypropylmethylsiloxy Units and End-Blocked With Trimethylsiloxy Units*

7.68 grams dodecamethylpentasiloxanes, 67.32 grams of the cyclic tetramer of dimethylsiloxane and 25.0 grams beta - carbethoxypropylmethylsiloxane cyclic tetramer were charged into 500 ml. round bottomed flask fitted with a motor driven stirrer and heated to 90° C. on a steam bath with stirring. The sulfuric acid (0.5 gram of 96 percent conc. $H_2SO_4$) was added and the heating and stirring continued for three hours. The oil was then cooled to room temperature and 100 cc. of a saturated solution of $NaHCO_3$ was added to kill the catalyst. The oil was then extracted with diethyl ether and washed with distilled water until the washings were neutral to pH paper. The ether was then evaporated off and 100 cc. of toluene added. The toluene and any residual water was then removed by vacuum stripping at 95° C. for 2 hours. A water-white oil was recovered having a viscosity at 25° C. of 83 cs.

*Example XXV.—Preparation of a Dimethylsilicone Oil, 10,000 Mol.-Wt., Containing 5 Wt. Percent Beta-Carbethoxypropylmethylsiloxy Units*

3.84 grams dodecamethylpentasiloxane, 5.0 grams beta-carbethoxypropylmethylsiloxane cyclic tetramer and 91.16 grams of the cyclic tetramer of dimethylsiloxane were charged to a 500 ml. round bottomed flask fitted with a motor driven stirrer. The flask was then heated to 80–90° C. on a steam bath with stirring, and the sulfuric acid added. The heating and stirring was continued for three hours. The flask was then cooled to room temperature and 100 cc. of a saturated solution of NaHCO₃ added to neutralize the acid. The oil was extracted with diethyl ether and the solution washed with distilled water until the water washings were neutral to pH paper. The toluene and any residual water was then removed by vacuum stripping at 100° C. for 2 hours. 92 grams of a water white oil was recovered having a viscosity at 25° C. of approximately 133 cs.

This application is a continuation-in-part of copending application Serial No. 615,490, filed October 12, 1956, which is now abandoned.

What is claimed is:

1. A process for producing beta-carbalkoxyethylsilanes of the formula:

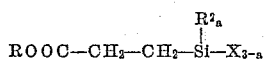

wherein R is an alkyl group, $R^2$ is a member of the class consisting of alkyl and aryl radicals, X is a member of the class consisting of halogen and alkoxy radicals and $(a)$ is an integer of from 0 to 2 inclusive; that comprises the steps of admixing a silane of the formula:

$$R^2_a H_b Si - X_{4-a-b}$$

wherein X, $R^2$ and $(a)$ are as above-defined, and $(b)$ is an integer having a value of 1 with an acrylate ester of the formula:

wherein R is as above defined, a platinum catalyst and tetrachloroethylene, said tetrachloroethylene being present in said admixture in an amount of from 1 to 10 parts by weight to each part by weight of the acrylate ester, maintaining said mixture at a temperature at which said silane and said acrylate react to produce a beta-carbalkoxyethylsilane of the class described.

2. The process as claimed in claim 1 wherein the solvent is tetrachloroethylene and wherein said tetrachloroethylene is employed in an amount of four parts by weight to each part by weight of the acrylate reactant.

3. Process for producing beta-carbethoxyethyltrichorosilane that comprises the steps of admixing trichlorosilane with tetrachloroethylene and a platinum catalyst, maintaining said mixture at a temperature in the range of from 20° C. to the reflux temperature of the mixture, adding ethyl acrylate to said mixture to cause said ethyl acrylate and said silane to react to produce said beta-carbethoxyethyltrichlorosilane, said tetrachloroethylene being present in said mixture in an amount from 1 to 10 parts by weight to each part by weight of said ethyl acrylate.

4. Process for producing beta-carbethoxyethylmethyldichlorosilane that comprises the steps of admixing methyldichlorosilane with tetrachloroethylene and a platinum catalyst, maintaining said mixture at a temperature in the range of from 20° C. to the reflux temperature of the mixture, adding ethyl acrylate to said mixture to cause said ethyl acrylate and said silane to react to produce said beta - carbethoxyethylmethyldichlorosilane, said tetrachloroethylene being present in said mxiture in an amount of from 1 to 10 parts by weight to each part by weight of said ethyl acrylate.

5. A process for the production of pure beta-carboalkoxyalkyl-substituted silanes which comprises heating an isomeric mixture of alpha- and beta-carboalkoxyalkyl-substituted silanes to a temperature sufficiently elevated to cause thermal decomposition of the alpha-carboalkoxyalkyl-substituted silane followed by distillation of the resulting mixture to recover the pure beta-carboalkoxyalkylsilane.

6. A process for the production of pure beta-carboalkoxyethylsilanes which comprises heating an isomeric mixture of alpha- and beta-carboalkoxyethyl substituted silanes at atmospheric pressure to a temperature sufficiently elevated to cause thermal decomposition of the alpha-carboalkoxyethyl substituted silane and recovering the pure beta-carboalkoxyethylsilane from the resultant mixture by distilling said mixture.

References Cited in the file of this patent

UNITED STATES PATENTS

| | | |
|---|---|---|
| 2,486,162 | Hyde | Oct. 25, 1949 |
| 2,570,462 | Lipscomb | Oct. 9, 1951 |
| 2,589,445 | Sommer | Mar. 18, 1952 |
| 2,589,446 | Sommer | Mar. 18, 1952 |
| 2,632,013 | Wagner et al. | Mar. 17, 1953 |
| 2,637,738 | Wagner | May 5, 1953 |
| 2,691,032 | Sommer | Oct. 5, 1954 |
| 2,721,856 | Sommer | Oct. 25, 1955 |
| 2,721,873 | Mackenzie et al. | Oct. 25, 1955 |
| 2,723,987 | Speier | Nov. 15, 1955 |
| 2,728,785 | Albisettiet et al. | Dec. 27, 1955 |
| 2,763,675 | Prochaska | Sept. 18, 1956 |
| 2,823,218 | Speier et al. | Feb. 11, 1958 |
| 2,855,381 | Sommer | Oct. 5, 1958 |
| 2,894,967 | Gilkey | July 14, 1959 |

FOREIGN PATENTS

| | | |
|---|---|---|
| 1,118,500 | France | Mar. 19, 1956 |

OTHER REFERENCES

Noll: "Textbook of Organic Chemistry," Saunders Co., Philadelphia, publishers (1951), p. 145.

British Intelligence Objectives Sub-Committee Final Report No. 1081, item No. 22, pp. 4–6 (released July 11, 1947).

Wagner et al.: "Ind. and Eng. Chem.," vol. 45 (February 1953, p. 373).

Andrianov et al.: "Izvest. Akad. Nauk S.S.S.R., Otdel. Khim Nauk," June 1956, pp. 702–6 (51 Chem. Abs. 1877).

McGregor: "Silicones and their Uses," McGraw-Hill Book Co. Inc., New York, published (1954), pp. 268–72.

Goodman et al.: Journal Am. Chem. Soc., vol. 78, page 4493, Sept. 5, 1956.